US012112633B2

(12) United States Patent
Wiesner et al.

(10) Patent No.: US 12,112,633 B2
(45) Date of Patent: Oct. 8, 2024

(54) METHODS AND SYSTEMS FOR GENERATING PARKING RELATED DATA

(71) Applicant: TomTom Traffic B.V., Amsterdam (NL)

(72) Inventors: Steffen Gunther Wiesner, Amsterdam (NL); Joakim Skarding, Amsterdam (NL); Konrad Bösche, Amsterdam (NL); Gunnar Schmidt, Amsterdam (NL)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 16/337,906

(22) PCT Filed: Sep. 29, 2017

(86) PCT No.: PCT/EP2017/074855
§ 371 (c)(1),
(2) Date: Mar. 28, 2019

(87) PCT Pub. No.: WO2018/060468
PCT Pub. Date: Apr. 5, 2018

(65) Prior Publication Data
US 2019/0228661 A1      Jul. 25, 2019

Related U.S. Application Data

(60) Provisional application No. 62/401,822, filed on Sep. 29, 2016.

(51) Int. Cl.
*G08G 1/14*        (2006.01)
*G01C 21/34*       (2006.01)
(Continued)

(52) U.S. Cl.
CPC ......... *G08G 1/147* (2013.01); *G01C 21/3492* (2013.01); *G01C 21/3685* (2013.01);
(Continued)

(58) Field of Classification Search
None
See application file for complete search history.

(56) References Cited

U.S. PATENT DOCUMENTS 7,936,284 B2   5/2011   Levine et al.
8,423,275 B1 *  4/2013   Kandal ............... G08G 1/0112
                                                      340/853.1
(Continued)

FOREIGN PATENT DOCUMENTS

WO   2013144192 A1   11/2013

OTHER PUBLICATIONS

Search Report for International Application No. PCT/EP2017/074855 dated May 17, 2018.
Search Report for International Application No. PCT/EP2017/074860 dated Apr. 5, 2018.

*Primary Examiner* — Aniss Chad
*Assistant Examiner* — Mahmoud M Kazimi
(74) *Attorney, Agent, or Firm* — Park, Vaughan, Fleming & Dowler LLP

(57) ABSTRACT

A method is disclosed for generating parking related data in respect of one or more navigable elements of a navigable network within a geographic area, each navigable element being represented by a segment of an electronic map, the electronic map comprising a plurality of segments representative of the navigable network. The method comprises obtaining positional data relating to trips made by vehicles in the navigable network, each trip being a journey between stationary periods indicative of the vehicle being in a parked state. The method comprises, for each one of the plurality of trips, analysing the positional data to identify a parking space search portion of the trip; and analysing the positional data corresponding to the parking space search portions of (Continued)

the trips to obtain, for each one of a plurality of segments of the electronic map, a parking related parameter associated with the segment.

18 Claims, 7 Drawing Sheets

(51) Int. Cl.
*G01C 21/36* (2006.01)
*G08G 1/01* (2006.01)

(52) U.S. Cl.
CPC ....... *G01C 21/3691* (2013.01); *G08G 1/0112* (2013.01); *G08G 1/0129* (2013.01); *G08G 1/0133* (2013.01); *G08G 1/0141* (2013.01)

(56) References Cited

U.S. PATENT DOCUMENTS

| | | | |
|---|---|---|---|
| 9,076,333 B2* | 7/2015 | Ishikawa | G08G 1/0112 |
| 10,720,057 B2* | 7/2020 | Wiesner | G08G 1/0133 |
| 11,237,007 B2* | 2/2022 | Fowe | G06F 16/29 |
| 2010/0052946 A1* | 3/2010 | Levine | G08G 1/144 |
| | | | 340/932.2 |
| 2010/0299055 A1 | 11/2010 | Hillbrandie et al. | |
| 2012/0161984 A1 | 6/2012 | Amir | |
| 2012/0161986 A1* | 6/2012 | Amir | H04W 4/44 |
| | | | 340/932.2 |
| 2013/0211705 A1* | 8/2013 | Geelen | G01C 21/00 |
| | | | 701/410 |
| 2014/0214319 A1 | 7/2014 | Vucetic et al. | |
| 2016/0061618 A1* | 3/2016 | Benenson | G01C 21/3453 |
| | | | 701/428 |
| 2016/0210860 A1 | 7/2016 | Belzner et al. | |

* cited by examiner

METHODS AND SYSTEMS FOR GENERATING PARKING RELATED DATA

CROSS-REFERENCE TO RELATED APPLICATIONS

The present application is a National Stage of International Application No. PCT/EP2017/074855, filed on Sep. 29, 2017, and designating the United States, which claims benefit to U.S. Patent Application 62/401,822 filed on Sep. 29, 2016, entire content of which application is incorporated herein by reference.

FIELD OF THE INVENTION

This invention relates to a method of generating parking related data in respect of one or more segments in an area covered by an electronic map as well as a system, a server and a navigation device on which part or all of the method may be implemented. In particular, the invention relates to generating one or more parking probability values for the one or more segments indicative of the likelihood of finding a parking space on the segment. The generated parking related segment data may in particular, but not exclusively, be used in parking time prediction and parking space search route generation for an electronic navigation device, such as a portable navigation device (PND). In accordance with certain further aspects, the present invention relates to methods of obtaining profile data indicative of the time dependence of a time dependent parameter, which may be, although is not necessarily, a parking related parameter.

BACKGROUND OF THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Navigation devices also typically have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for searching for a "best" or "optimum" route between the start and destination address locations from the map data. A "best" or "optimum" route is determined on the basis of predetermined criteria and need not necessarily be the fastest or shortest route. The searching for a route along which to guide the driver can be very sophisticated, and the search may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: (i) a user deviates from the previously calculated route during navigation (either by accident or intentionally); (ii) real-time traffic conditions dictate that an alternative route would be more expedient and the device is suitably enabled to recognize such conditions automatically; or (iii) a user actively causes the device to perform route re-calculation for any reason.

Although route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

It has been proposed to associate data indicative of a parking probability with segments of a digital (or electronic map). Such data is indicative of the likelihood that a driver will find a parking space on the segment, and is typically time dependent. Various methods have been proposed to determine and use parking probability data. For example, WO 2010/081546 A1, the entire content of which is incorporated herein by reference, discloses methods of determining time dependent parking probability data for segments based on analysis of data indicative of the occupation of parking locations. The parking locations may be inferred from positional data indicative of vehicles being at a standstill at an end of a trip. A parking probability profile associated with a segment may be determined, from which may be obtained a parking probability for each one of a set of predetermined time periods, e.g. every 30 minutes of the day.

The parking probability data in respect of segments may be used in various manners. The parking probability data may be used by route planning algorithms on PNDs on which the map is processed. For example, a user may be presented with an option on their PND to have it generate a route from a current position that maximises the likelihood of finding a parking space in the vicinity. Some exemplary such methods are described in WO 2011/157296 A1, the entire content of which is incorporated herein by reference.

The Applicant has identified that there remains scope for improvement in methods of generating parking related data, such as a parking probability or expected parking search time in respect of segments of an electronic map.

SUMMARY OF THE INVENTION

According to a first aspect of the invention there is provided a method of generating parking related data in respect of one or more navigable elements of a navigable network within a geographic area, each navigable element being represented by a segment of an electronic map, the electronic map comprising a plurality of segments representative of the navigable network, said method comprising:

obtaining positional data relating to trips made by vehicles in the navigable network, each trip being a journey between stationary periods indicative of the vehicle being in a parked state;

analysing, for each one of the plurality of trips, the positional data in respect of the trip to identify a parking space search portion of the trip;

analysing the positional data corresponding to the parking space search portions of the trips to obtain a parking related parameter for each one of a plurality of segments of the electronic map; and associating each of the obtained parking related parameters with the respective segment.

In accordance with the invention, parking related parameter data is determined based on positional data relating to trips made by vehicles in the navigable network. In contrast to prior art techniques for determining parking related data, e.g. parking probability data, for segments based on positional data, which consider only the stationary period at the end of a trip indicative of a driver having parked on a given segment, the present invention takes into account an end portion of the trip which is deemed to correspond to a period spent searching for a parking space. This period may be defined between a point at which the driver is deemed to have commenced a parking space search, and the stationary period at the end of the trip. Thus, rather than just looking at the final stationary location of the vehicle following a successful parking attempt, an extended portion of the trip leading up to that final parked location is considered. This has been found to provide more accurate parking parameter data for segments, as it is possible to base the data not only on the eventual successful parking of the vehicle, but also on the preceding search, and the traversal of segments during the search where parking was unsuccessful.

As used herein, a "trip" refers to a journey made by a vehicle between stationary periods indicative of the vehicle being in a parked state.

The present invention also extends to a system for carrying out a method in accordance with any of the aspects or embodiments of the invention herein described.

In accordance with a further aspect of the invention there is provided a system for generating parking related data in respect of one or more navigable elements of a navigable network within a geographic area, each navigable element being represented by a segment of an electronic map, the electronic map comprising a plurality of segments representative of the navigable network, said system comprising:

means for obtaining positional data relating to trips made by vehicles in the navigable network, each trip being a journey between stationary periods indicative of the vehicle being in a parked state;

means for analysing, for each one of the plurality of trips, the positional data in respect of the trip to identify a parking space search portion of the trip;

means for analysing the positional data corresponding to the parking space search portions of the trips to obtain a parking related parameter for each one of a plurality of segments of the electronic map; and means for associating each of the obtained parking related parameters with the respective segment.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

The system and/or one or more processors and/or processing circuitry may be at least part of a server or a navigation device. The steps of the method of the present invention in any of its aspects or embodiments may therefore be carried out in part by a server and/or in part by a navigation device. For example the steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Accordingly the invention can encompass a server arranged to generate parking related parameter data for association with one or more segments of the electronic map.

The navigable network may comprise a road network, wherein each navigable element represents a road or a portion of a road. For example, a navigable element can represent a road between two adjacent intersections of the road network, or a navigable element may represent a portion of a road between two adjacent intersections of the road network. As will be appreciated, however, the navigable network is not limited to a road network, and may comprise, for example, a network of foot paths, cycle paths, rivers, etc. It should be noted that the term "segment" as used herein takes its usual meaning in the art. A segment of an electronic map is a navigable link that connects two points or nodes. While embodiments of the present invention are described with particular reference to road segments, it should be realised that the invention may also be applicable to other navigable segments, such as segments of a path, river, canal, cycle path, tow path, railway line, or the like. Thus, any reference to a "road segment" may be replaced by a reference to a "navigable segment" or any specific type or types of such segments.

The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

In the present invention, at least some, although not necessarily all, the segments of the electronic map have a value of a parking related parameter associated therewith, e.g. parking probability, expected parking search time, etc. As will be discussed in more detail below, a segment may have a plurality of values of the parking related parameter, e.g. parking probability values associated therewith, each value being in respect of a different period of time.

The present invention involves obtaining positional data relating to the movement of a plurality of devices along one or more navigable elements of a navigable network with respect to time. The step of obtaining the positional data relating to the movement of devices along a navigable element is carried out by reference to the electronic map data indicative of the segment representing the navigable element of the network. The method may involve a step of matching positional data relating to the movement of devices in a geographic region including the network of navigable elements to each segment of the electronic map that is being considered in accordance with the invention.

In some arrangements the step of obtaining the positional data may comprise accessing the data, i.e. the data being previously received and stored. The positional data is preferably historical data. In this context the word historical should be considered to indicate data that is not directly reflective of conditions on the segment at the present time or in the recent past (perhaps within roughly the last five, ten, fifteen or thirty minutes). Historical data may for example relate to events occurring days, weeks or even years in the past.

In some arrangements the method may comprise receiving the positional data from the devices. In embodiments in which the step of obtaining the data involves receiving the data from the devices, the method may further comprise storing the received positional data before proceeding to carry out the other steps of the present invention. The step of receiving the positional data need not take place at the same time or place as the other step or steps of the method.

As discussed above, the positional data may be collected from a plurality of devices, and relates to the movement of those devices with respect to time. Thus, the devices are mobile devices. The positional data is preferably associated with temporal data, e.g. a timestamp. The positional data may be used to provide a positional "trace" of the path taken by the device. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indicating the position of the receiver at a particular point in time, and which preferably receives updated position information at regular intervals. Such devices may include navigation devices, mobile telecommunications devices with positioning capability, position sensors, etc. Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

Of course, the positional data may be obtained from a combination of different devices, or a single type of device. However, the present invention is not limited to the use of positional data obtained from a particular type of device, or devices associated with a particular form of transport, e.g. vehicles, and probe data from devices associated with multiple forms of transport may equally be taken into account. Typically, any probe data indicative of the movement of a device with respect to time along a navigable element may be used.

As discussed above, the positional data for a segment preferably comprises a sequence of time stamped positions indicative of the movements of a plurality of different devices. The sequence of positions for a single device can be analysed to identify data corresponding to one or more individual trips made by the vehicle (e.g. in an applicable time period) for use in the methods of the present invention.

The positional data obtained in accordance with the invention in any of its aspects or embodiments may already relate to individual trips made by vehicles, or the method may comprise an initial step of obtaining positional data relating to the movement of vehicles in the navigable network, e.g. over a given period, and analysing the positional data to obtain the positional data relating to trips made by vehicles. For example, the positional data may be made up of traces indicating the position of each one of the plurality of vehicles over a predetermined period, such as 24 hours. The positional data for each vehicle will then typically be made up of a plurality of individual trips. A trip may be identified from positional data for a vehicle in any suitable manner known in the art, using suitable criteria to identify stationary periods which can be taken to be indicative of the vehicle being in a parked state, rather than merely in a more transitory standstill state. For example, the parked state may correspond to a stationary period of a duration exceeding a predetermined threshold. Some initial filtering of the trip data may be carried out to identify trip data for use in determining parking related parameter data in accordance with the invention, i.e. parking relevant trips. For example, trips may be required to have a length exceeding a predetermined threshold. If a vehicle appears to park soon after setting out, this may in fact merely be a temporary standstill period in a longer trip, rather than the end of a trip. For example, the driver may have stopped temporarily to drop someone off. Excessively noisy positional data, in particular in the end portion which is critical to obtaining parking data in accordance with the invention, may be discarded. Trips ending at a speed above a predetermined threshold may similarly be discarded, in particular when the trips end on a high FRC (functional road class) segment.

In accordance with the invention, the positional data relating to each trip made by a vehicle that is considered for the purposes of the invention is analysed to identify a parking space search portion of the trip. The parking space search portion of the trip corresponds to an end portion of the trip terminating in the stationary period indicative of the vehicle being in a parked state at the end of the trip. Preferably the step of analysing the positional data to identify a parking space search portion of a trip comprises analysing the positional data in respect of the trip to identify a start of a parking space search during the trip, the start of the parking space search defining the start of the parking space search portion of the trip. The start of the parking space search is a point in the trip (by reference to a time or a position within the trip) at which it is assumed that the driver has commenced a search for a parking space. The parking space search portion (or the start of the parking space search) may be detected based on one or more criteria using the positional data. It will be appreciated that the positional data may be analysed to determine whether one or more features indicative of a (start of) a search for a parking space are present. In preferred embodiments the criteria include the positional data being indicative of one or more of: the vehicle performing one or more turns; the vehicle performing one or more loops; and the vehicle travelling at a speed below a predetermined threshold. These criteria will now be discussed in more detail.

Various features are identified using the positional data relating to the trip may be taken to be indicative of the start of a parking space search. In general, a single one of the features is unlikely to be definitively indicative of the start of a parking space search. Multiple ones of the features may therefore be taken into account. An algorithm may be used which combines criteria based on detection of the multiple features in any suitable manner.

The step of identifying the start of a parking space search may comprise analysing the positional data relating to a trip to identify a point at which the speed of travel of the vehicle is below a predetermined threshold. The predetermined threshold may be set with respect to a free flow speed for the segment. For example, the threshold may be some fraction of the free flow speed. Such a point may be considered to be a candidate point for the start of a parking space search. It will be appreciated that the positional data relating to the trip will typically comprise a plurality of position data samples in respect of different times. The speed of travel for the vehicle may be determined by considering consecutive position data samples. The method may comprise repeating the steps of determining the speed of travel of the vehicle for consecutive pairs of position data samples starting at the end of the trip and working backwards to identify candidate points for the parking space search start.

The free flow speed for a segment as referred to herein is defined as the average speed of travel across the element represented by the segment during a period of time in which there is no or substantially little traffic. This period may for example be one or more night-time hours where speed over the segment may be less influenced by other users. The free flow speed can be determined using the positional data described above. Such measurements of free flow speeds will still reflect the influence of speed limits, road layout and traffic management infrastructure for example, and are more accurate than posted speed limits, legal speeds or speed assignments based on road category.

A determination that the candidate point corresponds to the start of a parking space search may require one or more further criteria to be fulfilled. Each time a candidate point is identified, the one or more further criteria may be considered to determine whether the candidate point may be confirmed as the start of a parking space search. The method may further require that the point is within a predetermined distance of the end of the trip. A low speed toward the end of the trip is more likely to be indicative of the start of a parking space search. The method may alternatively or additionally require that the point is within a predetermined distance of a turn performed by the vehicle and/or within a loop performed by the vehicle. Alternatively or additionally, the method may take into account a distance travelled at the speed below the predetermined threshold. For example, it may be required that the vehicle travels at the low speed for a predetermined distance.

In preferred embodiments, the identification of a start of a parking space search is based on detecting a point at which the vehicle is travelling at a speed below a predetermined threshold in a given proximity to an end of the trip and/or in a given proximity to one or more turns performed by the vehicle and/or a loop performed by the vehicle. The point may be required to be within a loop performed by the vehicle where such a loop is detected. However, it will be appreciated that alternatively, the start of a parking space search may be based on detecting a turn and/or loop performed by the vehicle, and optionally one or more further measures, without consideration of the speed of travel of the vehicle.

A turn or loop performed by a vehicle may be detected in any suitable manner using the positional data. A turn or loop refers to such a feature in the trajectory of the vehicle. Such features may be detected based on the positional data in its raw state, or may involve first map matching the positional data and then detecting such features in relation to the map matched segments. In preferred embodiments the detection of a turn is based on detecting a bearing change of greater than a predetermined threshold along a segment or between segments. The bearing change may be a bearing change between consecutive map matched position data samples e.g. at either end of a segment or between segments, or may be a consolidated bearing change resulting from a consolidation of a plurality of smaller bearing changes between consecutive map matched position data samples. It will be understood that similar techniques may be applied to raw positional data. The method may comprise classifying a turn as a U-turn or orthogonal turn. Detecting a loop may be based on detecting a consistent change in bearing (in the raw, or preferably map matched positional data) in the same direction resulting in a total change of angle of approximately 360 degrees.

The start of the parking space search defines the start of a portion of the trip extending to the end of the trip, which is referred to as the parking space search portion of the trip. In accordance with the invention, the parking space search portions of the trips are used in obtaining the parking related parameter for segments. The method comprises analysing the positional data corresponding to the parking space search portions of the trips to obtain parking related parameter for each of a plurality of segments of the electronic map. The method may comprise analysing only the subset of the positional data corresponding to the parking space search portions of the trips, i.e. and not the other portions of the trips, i.e. the initial portions of the trips. The parking space portion of a trip may involve traversing one or more segments. In some embodiments the parking space portion of the trip may involve traversing multiple segments.

The parking related parameter for each segment that is obtained may be any suitable parameter which may be derived using the data indicative of the parking space search portions of the trips. However, preferably the parking related parameter is a parking probability for the segment or an expected parking search time for the segment. The term "expected parking search time" as used herein refers to the expected time to find a parking space in the vicinity after arriving at the segment with the aim of parking on the segment. The term "parking probability" for a segment used herein refers to the likelihood of finding a parking space on the segment. While embodiments of the invention will be described with particular reference to the case in which the data is parking probability data, it will be appreciated that the embodiments may, unless the context demands otherwise, equally be applied to obtaining expected parking search time data.

The value of the parking related parameter, e.g. parking probability value or expected parking search time value, is a measure reflecting the typical parking situation on the element represented by the respective segment, or, in the vicinity thereof as appropriate. The parking related parameter value is thus a historical measure representative of the expected value of the parameter e.g. the likelihood of finding a parking space on a navigable element or the expected time to find a parking space based on the analysis of historical data. In preferred embodiments in which the parking related parameter is a parking probability, the higher the parking probability parameter value the greater the likelihood of successfully parking on the navigable element represented by the segment. Although, it will be appreciated, that the parking probability parameter value could be defined such that the lower the parking probability parameter value the greater the likelihood of successfully parking on the navigable element represented by the segment.

The parking related parameter obtained for a segment is based upon analysing the positional data corresponding to the parking space search portions of multiple trips. This positional data may be referred to as the parking space search portion data. In contrast to prior art techniques, the trips are not necessarily trips which result in successful parking on the segment.

In some preferred embodiments in which a parking probability for a segment is obtained, the parking probability obtained is based on a ratio of the number of times a parking space is successfully found on the segment according to the parking space search portion data to the number of times the segment is traversed without finding a parking space according to the parking space search portion data. The parking space search portion data includes the positional data corresponding to the parking space search portions of multiple trips. Determining the number of times a segment is traversed without finding a parking space according to the parking space search portion data may comprise counting the number of times the segment is traversed in a parking space search portion of a trip without parking on the segment. In this situation, ultimately parking may occur on a different segment or on the same segment at a later time. A segment may be traversed one or more times in the parking space search portion of each trip. Determining the number of times a parking space is successfully found on the segment according to the parking space search portion data may comprise counting the number of times that a parking space search portion of a trip terminates on the segment. One or more criteria may be used to filter out any trips where the parking space search portion terminates on a segment but which are not considered indicative of parking on the segment. For example, this might be where a user turned off their navigation device, so ending a positional data trace while at a traffic light, etc. The parking probability determined for a segment is an average based on the positional data considered.

In embodiments in which an expected parking space search time for a segment is obtained, the expected parking space search time is preferably based on the average remaining time spent searching for a parking space after traversing the segment according to the parking space search portion data. The expected parking space search time is an average based on the durations of the remainder of the parking space search of multiple trips after traversing the segment according to the parking space search portions of the trips. Where a segment is traversed multiple times in a given parking space search portion of a trip, the first traversal should preferably be used to determine the remaining time spent search for a parking space. The remaining time spent searching for a parking space after traversing the segment corresponds to the remaining time from traversal of the segment up until the start of the final stationary period indicative of the vehicle being in a parked state. Typically this will correspond to the end of the parking space search portion. Thus, the remaining time spent searching for a parking space according to the parking space search portion data may simply correspond to the duration of the remainder of the parking space search portion.

As will be appreciated, for many navigable elements, a parking related parameter associated with the segment, e.g. the likelihood of finding a parking space thereon, tends to fluctuate throughout the day, and indeed also throughout the week. For example, a segment may be located in a business district, where parking spaces are more likely to be free out of office hours. Conversely spaces may more easily be found in a residential district during office hours. Preferably the parking related parameter is time dependent. The determined value of the parking related parameter determined is preferably in respect of a given predetermined time period.

In preferred embodiments of the invention, a plurality of values of the parking related parameter, e.g. parking probability or expected parking search time, are determined for each segment, each value being in respect of a different time period, e.g. each hour. The time period is preferably a recurring time period, e.g. a time period that recurs on a weekly basis, such as between 9 h00 and 10 h00 on a Monday. In such embodiments, a value of the parking related parameter for the segment is determined for each time period using positional data relating to parking search portions of trips in the respective time period.

A value of a time dependent parking parameter in respect of a given time period may be determined based on positional data relating to the parking space search portions of trips taken by vehicles in the applicable time period. Preferably the method comprises, for one or more (and preferably a plurality of) predetermined time periods, obtaining positional data relating to parking space search portions of trips made by vehicles in the navigable network in the predetermined time period, and analysing the positional data to obtain, for each one of a plurality of segments of the electronic map, a value of the parking related parameter in respect of the predetermined time period. For example, this may be a parking probability for the predetermined period, i.e. the likelihood of finding a parking space in the predetermined period, or an expected parking search time for the period, i.e. the expected time to find a parking space after traversing the segment with the aim of parking in the predetermined period. The positional data relating to the parking space portion of each trip may be determined as described above.

In some preferred embodiments a parking probability in respect of a given time period obtained for a segment is based on a ratio of the number of times the segment is traversed within the given time period without finding a parking space according to the parking space search portion data to the number of times a parking space is successfully found on the segment within the given time period according to the parking space search portion data. The parking probability for a given time period is therefore an average probability over the period.

Preferably the method comprises determining a profile for the time dependent parking related parameter in respect of each segment indicative of a variation in the parking related parameter for the segment with respect to time. A value of the parking related parameter for the segment may be derivable from the parking related parameter profile for the segment for each one of a set of predetermined time periods.

The method preferably comprises associating data indicative of the determined parking related parameter for the segment with each segment in the electronic map for which such data is determined. In embodiments in which a plurality of values of the parking related parameter are obtained for the segment in respect of different time periods, the data can comprise the plurality of values of the parking related parameter themselves. Alternatively, the data can comprise a profile indicating the variation of the parameter with time, e.g. a parking probability profile, or a pointer thereto.

It will be appreciated that the density of parking events on segments that may be identified in the available positional data will typically not be high. Each trip will generate only one parking space search which may lead to successful parking. The majority of the positional data relating to a trip is of no relevance to parking. Thus, in contrast, for example, to determining speed profile data using positional data, e.g. as described in WO 2009/053411 A1, the entire content of which is incorporated herein by reference, where a much greater volume of relevant positional data exists that may be used to determine average speeds of travel for association with segments of an electronic map, when using positional data to obtain parking related parameter data, the volume of data may be insufficient to obtain reliable parking related parameter data for all segments in an area. In particular, insufficient data may be available to reliably describe the variation of a time dependent parking related parameter over time, e.g. a parking probability profile. Consequently parking related parameter data may be significantly affected by noise, particularly over time periods where fewer parking events occur, e.g. overnight. For example, the data may indicate significant variation in the parameter, e.g. parking probability for different periods, e.g. 1 hour time periods in the overnight period. It is desirable to be able to provide more reliable parking related parameter data that is less affected by noise, i.e. smoother data, and to provide such data in respect of segments in the geographic area describing the variation in the parking related parameter over the course of the day, and for different days of the week. The Applicant has realised that different segments in an area may exhibit similar time dependence in a relative value of a parking related parameter. Thus, by aggregating the parking related parameter data for different segments that exhibit similar time dependence in the relative values of their parking related parameter, it becomes possible to provide more detailed time dependent relative parking parameter data that can be considered to be applicable to each of the segments that share similar time dependence in their relative parking parameter data. Such more detailed time dependent relative parking parameter data may then be used to obtain an absolute value of the parking related parameter for a given segment at an applicable time.

Accordingly, where the parking related parameter is a time dependent parking related parameter, the method may comprise analysing the positional data corresponding to the parking space search portions of the trips to obtain, for each one of a plurality of first time periods, a relative value of the parking related parameter associated with each one of a plurality of segments of the electronic map in respect of the first time period. The first time periods may be overlapping. The method may then comprise clustering the segments into groups of segments based on identifying similarities in the variation of the relative value across the first time periods, such that the segments in each group are considered to vary in a similar manner across the first time periods, e.g. have a similar profile over the period of time defined by the set of first time periods. Once the segments have been sorted into a plurality of groups, the method may then comprise, for each group of segments, analysing the positional data corresponding to the parking space search portions of the trips to obtain, for each one of a plurality of second time periods, a relative value of the parking related parameter associated with the segments in the group in respect of the second time period. The second time period is preferably less than the first time period. The second time periods are preferably non-overlapping. Accordingly, for each group of segments, a profile is obtained indicating the variation of the relative value across the second time periods. Since the profile is based on data from a plurality segments, the profile can be thought of as an aggregate profile.

It is believed that the process of identifying groups of segments having a relative value of a time dependent parameter that varies in a similar manner, and using data indicative of the relative value of the parameter in respect of different segments of each group to obtain an aggregate profile for the time variation of the relative value of the parameter that is applicable to all members of the group, is advantageous in general, and is not limited to the context of a parking related parameter determined in accordance with the earlier aspects of the invention. These techniques may be generally applicable where the amount of data available in respect of individual segments may be insufficient to obtain a smooth profile indicative of the variation of a time dependent parameter with respect to time.

In accordance with a further aspect of the present invention there is provided a method of generating profile data indicative of the time dependence of a time dependent parameter in respect of one or more navigable elements of a navigable network within a geographic area, each navigable element being represented by a segment of an electronic map, the electronic map comprising a plurality of segments representative of the navigable network, said method comprising:

obtaining, for each one of a plurality of first time periods, a relative value of the time dependent parameter associated with each one of a plurality of segments of the electronic map in respect of the first time period;

clustering, for the or each set of time periods, the segments into groups of segments based on the relative values of the time dependent parameter obtained for the segments in each time period of the set, wherein, for each of the time periods of the set of time periods, the segments in each group of segments are considered to have similar relative values of the parking related parameter;

using, for each group, relative time dependent parameter data associated with the segments of the group to obtain an aggregate profile indicative of the time dependence of the relative value of the time dependent parameter, the aggregate profile being applicable to each of the segments of the group.

In accordance with a further aspect of the invention there is provided a system for generating profile data indicative of the time dependence of a time dependent parameter in respect of one or more navigable elements of a navigable network within a geographic area, each navigable element being represented by a segment of an electronic map, the electronic map comprising a plurality of segments representative of the navigable network, said system comprising:

means for obtaining, for each one of at least one set of a plurality of different time periods, a relative value of the time dependent parameter associated with each one of a plurality of segments of the electronic map in respect of the time period;

means for clustering, for the or each set of time periods, the segments into groups of segments based on the relative values of the time dependent parameter obtained for the segments in each time period of the set, wherein, for each of the time periods of the set of time periods, the segments in each group of segments are considered to have similar relative values of the parking related parameter; and means for using, for each group, relative time dependent parameter data associated with the segments of the group to obtain an aggregate profile indicative of the time dependence of the relative value of the time dependent parameter, the aggregate profile being applicable to each of the segments of the group.

The present invention in these further aspects of the invention may incorporate any or all of the features described in relation to the earlier aspects of the invention, to the extent they are not mutually exclusive.

In these further aspects of the invention, the time dependent parameter may be any suitable parameter that may be associated with a navigable element of the navigable network, and hence with a navigable segment thereof. The parameter is preferably a parking related parameter. The parameter is preferably an expected parking search time or a parking probability. These parameters are as defined earlier. Preferably the time dependent parameter is a parameter whose time dependence exhibits recurrent behaviour, e.g. on a daily or weekly basis. For example, as described above, a parking probability may be considered to have the same values in a corresponding time period on each Monday, or on each weekday. A parking search time parameter may similarly exhibit recurrent behaviour.

In these further aspects and embodiments of the invention, a relative value of the time dependent parameter associated with each one of a plurality of segments of the electronic map is obtained in respect of each time period of each one of at least one set of a plurality of different time periods. The time periods of the or each set of a plurality of different time periods are preferably recurring time periods, e.g. a time period that recurs on a weekly or daily basis. The time period is preferably a shorter time period within a longer time period. The shorter time period may have a length selected from a group of lengths, for example consisting of: 2 hours, 3 hours, 4 hours. The shorter periods for different time periods in a set of a plurality of time periods may be the same or different. The longer time period may be, for example, substantially equal to a day, or a week, or a set of days, such as weekends or weekdays. For example, the time periods of a first set of time periods may be time periods that recur each weekday There may be, for example, from four to ten such recurring time periods in each weekday, e.g. four periods might correspond to a morning, middle of the day, afternoon, night. The length of the time periods in a set of time periods may or may not be equal. For example, a longer time period may be used for the night period. In general, there may be a predetermined number of time periods in the or each set of a plurality of different time periods. The predetermined number may be a number greater than 4, and optionally in the range of from 4 to 10, such as from 4 to 6. Where multiple sets of a plurality of different time periods are used, the predetermined number of time periods in each set of time periods may be the same or different. The number of time periods used in each set may be chosen based on the expected density of the data points indicative of the value of the parameter with respect to time. For sparser data over time, longer time periods may be used. It will be appreciated that the time periods in each set of time periods may overlap.

In some embodiments the method is carried out in addition for each one of a second set of a plurality of time periods. The second set of time periods are preferably recurring time periods within a longer time period which is different to a longer time period associated with the time periods of the first set of time periods. For example, the longer time period for the first set of time periods may be a weekday, and the second set of time periods may be a weekend day. It may be considered that the same relative value of the time dependent parameter for a given time period on a particular weekday will be applicable to that time period when it recurs on another weekday, or conversely a relative value obtained for a time period on a given weekend day may be considered to apply to the other weekend day. Of course, the number of sets of time periods may be selected as desired, and each may contain recurring time periods in respect of a different longer time period. For example, different sets of time periods may be provided including recurring time periods on each day of the weekend, or on each day of the week. The number of time periods in the or each further set of a plurality of time periods may be the same or different to the number of time periods in the (first) such set. Preferably the method is carried out for each one of a first set of a plurality of time periods, and for each one of a second set of a plurality of time periods, wherein the time periods of the first and second sets of time periods are recurring time periods within respective longer time periods, wherein the second set of time periods are recurring time periods within a longer time period which is different to a longer time period associated with the time periods of the first set of time periods.

The step of obtaining, for each one of at least one set of a plurality of different time periods, a relative value of the time dependent parameter associated with each one of the plurality of segments of the map in respect of the time period may be carried out by analysing positional data indicative of the movement of vehicles in the navigable network with respect to time. The data in respect of movement of vehicles in the navigable network in the relevant time period is considered. The data may be data obtained from vehicles, i.e. probe data, as described in relation to the earlier aspects of the invention. In some preferred embodiments the positional data analysed is indicative of trips made by vehicles in the navigable network. The trips may be defined between stationary periods indicative of the vehicle being in a parked state, as in the earlier aspects and embodiments of the invention. These embodiments are appropriate where the parameter is a parking related parameter. Preferably the time dependent parameter is a parameter whose time dependence exhibits a recurrent behaviour, e.g. such that the same behaviour may be expected for a given time period on corresponding days of the week, or on the same day of each week, etc. In preferred embodiments in which the parameter is a parking related parameter, the relative value is preferably obtained based on data, e.g. positional data, relating to multiple trips involving visiting the segment in the time period.

The relative value of the time dependent parameter determined for each segment in respect of time period (e.g. each time period of the or each set of time periods) is preferably an average relative value of the parameter over the time period. In some preferred embodiments in which the time dependent parameter is a parking probability, the parking probability obtained for a segment in respect of the time period is based on a ratio of the number of times the segment is traversed in the time period without finding a parking space to the number of times a parking space is successfully found on the segment. In embodiments in which the parameter is an expected parking space search time, the expected parking space search time obtained for a segment in respect of the time period is preferably based on the average remaining time spent searching for a parking space after traversing the segment. Thus, determining the relative value of the time dependent parameter for a segment for a time period may involve consideration of data relating to other segments, e.g. those segments forming part of a parking space search portion of a trip as in the earlier aspects and embodiments, or may consider only data relating to the relevant segment, e.g. determining successful parking events on the segment. It is envisaged that methods similar to prior art techniques for determining a parking probability may be used, for example, which are concerned only with counting the number of times a trip ends on a segment indicating a parking event.

The average relative value may be any type of average, such as a mean. The average may be determined by calculating individual values for the parameter for different times in the time period and then averaging the individual values, or by collecting data for the entire time period, and determining a single value of the parameter for the period.

The relative value of the time dependent parameter for each one of the or each set of a plurality of different time periods may be obtained by using each time period of the set of time periods as a bin, and binning data indicative of values of the parameter obtained for times within the time period in the applicable bins. The data indicative of the value of the parameter may be an actual value of the parameter, or data enabling such a value to be determined. The data in each bin may then be averaged to obtain the relative value of the parameter for the bin, or time period.

The method may comprise obtaining a vector in respect of each segment, the vector having a plurality of components, each component being indicative of the relative value of the time dependent parameter in a respective one of the time periods of one of the sets of a plurality of different time periods. Respective vectors for a segment may be obtained in respect of each set of time periods. Each vector will have a number of components corresponding to a number of time periods in the relevant set of time periods.

In these further aspects and embodiments of the invention in which a relative value of the time dependent parameter is obtained for a given time period, this may be carried out in any suitable manner. The relative value is a value which permits comparison between values obtained in respect of different segments so as to enable the segments to be clustered into groups exhibiting similar behaviour. The relative value may be a normalised value. The relative value in respect of a time period may be determined using a mean value for the parameter determined for the time period. For example, the absolute value for the time period may be divided by the mean value, or the mean value may be subtracted therefrom.

The method comprises, for the or each set of time periods, clustering the segments into groups of segments based on the relative values of the time dependent parameter obtained for the segments in each time period of the set. The relative values of the time dependent parameter for the segments in the time periods, e.g. the components of the vector are analysed to enable groups of segments having similar time dependent behaviour in the relative time dependent parameter over the time periods of the set of time periods to be identified. One set of groups is obtained in respect of each set of time periods for which relative values of the parameter are obtained.

The or each set of groups includes a plurality of groups of segments. Each group of segments is a cluster that exhibits similar relative behaviour in the time dependent parameter over the time periods considered. It has been found that the time dependence of the relative value of the parameter associated with segments will tend to fall into one of a limited set of patterns. Thus, in a given set of time periods, groups of segments may be identified that have approximately similar relative values of the parameter in each corresponding time period considered. The clustering of the segments may be performed using any suitable clustering technique known in the art, such as k-means clustering. The number of groups in each set may be chosen as desired, and the numbers of groups in each set may be the same or different where multiple sets of groups are obtained. This may be carried out to achieve a balance between processing efficiency, and granularity of the resulting data. This may be achieved, for example, by appropriately controlling a clustering process. The clustering may take into account other factors in addition to the relative values of the time dependent parameter which may be relevant identifying segments that may have similar patterns in the time dependence of the parameter, such as road class etc.

In one exemplary embodiment, relative values of a parking probability are obtained for segments in each time period in a first set of four time periods on a Monday, and a second set of four time periods on a Sunday. The segments are the clustered into a set of six groups in respect of each set of time periods i.e. six groups for Monday and six groups for Sunday. Each group includes segments whose relative parking probability value is similar in each relevant time period. For example, the relative parking probability values may be similar in the morning, afternoon, evening and at night, where these are the four periods considered. Of course, different numbers of groups may be for each set of time periods.

Once the segments have been assigned to the groups, an aggregate profile is obtained for each group, based on relative values of the time dependent parameter associated with each of the segments of the group. Thus, the aggregate profile takes into account relative values of the parameter obtained in respect of multiple ones of the segments over the time period. This provides a larger pool of data than when attempting to obtain a profile in respect of a single segment. For example, in the case of a parking related parameter, there will be a much larger number of parking events to take into account, occurring in relation to any of the segments of the group. In any time period, the amount of data that can be used to obtain the aggregate profile will be greater than when determining a profile based on data relating to a single segment, reducing the problem of noise that may occur when attempting to determine a profile of a time dependent parameter using relatively sparse data. A single aggregate profile is obtained indicative of the time dependence of the relative value of the time dependent parameter over time, which profile may be considered to be applicable to each of the segments of the group. Thus, the value of the parameter according to the profile may be assumed to be the value of each member of the group at the relevant time. The aggregate profile is applicable to over the time periods to which the set of time periods used in identifying the group relates, e.g. weekdays, weekends, etc. It will be appreciated that the same segment may be clustered into different groups in respect of different sets of time periods, and thus may be associated with a different aggregate profile.

The step of obtaining the aggregate profile may comprise determining a plurality of relative values of the parameter in respect of a plurality of time periods using relative time dependent parameter data associated with segments of the group. The plurality of time periods are recurring time periods. Preferably the number of time periods in the plurality of time periods is greater than the number of time periods in the set of time periods used to obtain the relative parking probability values for the segments used in identifying the group. Preferably the time periods in the plurality of time periods are shorter than the time periods in the set of time periods used to obtain the relative parking probability values for the segments used in identifying the group. For example, determining the aggregate profile may involve obtaining relative values for the parameter in respect of recurring hourly time periods. The number of time periods used in obtaining the aggregate profile may be selected as desired to provide a given level of granularity in the data. The relative value for the parameter obtained in respect of each time period may be an average value based on the values of the parameter associated with segments in the group. It will be appreciated that not every segment in the group may provide a value of the parameter for every time period. This is because the data may be relatively sparse for some segments, at least for certain time periods. The average value is preferably a median value. Such an average has been found to provide more meaningful aggregate profiles than a mean value, although alternatively a mean value may be used.

The aggregate profile enables a value of the parameter to be obtained for any desired time for any segment of the group. As an aggregate profile is obtained for each group of segments, an aggregate profile is available for each segment considered. It is envisaged that the methods of the present invention may be used to obtain such data in respect of each segment of a geographical area, such as a city, e.g. a parking probability or expected parking search time for the segment. In this way, detailed data indicative of the variation of the parameter with respect to time may be obtained for each segment, even though the actual data in respect of the individual segment may have been too sparse to obtain a meaningful profile for the variation of the parameter at least in certain time periods.

The method preferably comprises associating, e.g. storing data indicative of the aggregate profile with each segment of the group. The data may be the profile, or may be a reference or pointer to the profile. It will be appreciated that the method results in a set of a plurality of standard aggregate profiles. Each segment may be associated with a reference or pointer to the applicable profile for that segment, i.e. based on the group to which it was assigned.

The aggregate profile may provide a relative value of the parameter for the segment. Before the profile, or a value obtained therefrom for a given time is used, the method may comprise transforming the profile so as to be indicative of absolute values for the parameter for the segment, or transforming a relative value obtained from the profile into an absolute value of the parameter for the segment. The transforming may involve a scaling process. The transforming may be carried out using an absolute value or values of the parameter known for the segment for a given time or times. It may be necessary to limit the resultant profile, or value obtained therefrom to be within a bounded range, e.g. 0 to 1.

In some embodiments the method further comprises associating each segment of the group with data for use in transforming the profile so as to be indicative of absolute values for the parameter for the segment, or for transforming a relative value obtained from the profile into an absolute value of the parameter for the segment. Such data may comprise an absolute value or values of the parameter for the segment in respect of a given time or times.

In other embodiments the aggregate profile for a segment that is associated therewith may be indicative of absolute values of the parameter for the segment. In other words, transformation of the profile may be carried out before the data indicative of the profile is associated with the segment. The method of claim may then comprise transforming the aggregate profile so as to be indicative of absolute values for the parameter for the segment, and associating data indicative of the transformed profile with the segment.

Any suitable data may be used in transforming a relative value of the parameter to an absolute value, or for so transforming the profile. The data need not be, for example, obtained from positional data. The data may be measured or otherwise expected or known data relating to a value or values of the parameter for the segment.

Where a plurality of sets of groups of segments are obtained, each segment may be associated with data indicative of multiple aggregate profiles applicable to different time periods, e.g. weekends, weekdays, etc.

Parking related parameter data generated in accordance with the present invention in any of its aspects or embodiments (whether or not in the form of a parking related parameter profile, or obtained therefrom) may be output and/or used in any desired and suitable way. The method extends to outputting and/or using parking related parameter data obtained in accordance with the invention in any of its aspects, or from an aggregate profile in respect of the parameter obtained in accordance with the invention in any of its aspects. The parking related parameter data, e.g. parking probability data, may be used to generate a parking search route. Such a route may be generated as part of an initial planning of a route from an origin to a destination, i.e. so that the end portion of the route incorporates a parking search. However, typically the parking search route is generated from a current position. This may be toward the end of a pre-planned route, whether or not in response to a user request, or, more typically, the initiation of parking search route generation may be in response to a user request while free driving. The parking related parameter, e.g. parking probability data, for the applicable time should be used. The aforementioned WO 2010/157296 A1 discloses techniques for planning a parking search route based on parking probability data.

In preferred embodiments, the method may further comprise providing the electronic map and/or the data indicative of the parking related parameter, e.g. parking probability, that is associated with one or more segments to a computing device, e.g. a remote computing device, such as a navigation device, for use in one or more of: determining a parking search route, e.g. from a current position using the electronic map; and determining an estimated parking time from a current position using the electronic map.

The method may, in embodiments, further comprise using the computing device to perform one of more of the aforementioned operations. For example, the parking related parameter data may be used by route planning algorithms to plan one or more parking search routes, preferably having an associated search time or estimated time of arrival (ETA). Thus, in some embodiments the method comprises determining a route across an area covered by the electronic map. This may comprise exploring routes based on the parking probability data and then generating a navigable route.

The method of the present invention may accordingly be implemented in the context of a navigation operation. Thus, the method may be carried out, at least in part, by a system or device having navigation functionality. However, it will be appreciated that the methods may also be carried out by any suitable system or device having route generating capability, but not necessarily navigation functionality. For example, the methods may be implemented by a computer system, e.g. a desktop or laptop system, which does not have navigation functionality. A user may be presented with a generated route which may then be printed or otherwise used to aid route selection at a subsequent time, or, for example, the route may be stored for future use, e.g. downloading to a navigation device.

In some embodiments, the step of determining a route across an area covered by the electronic map is performed on a server. In other embodiments, the parking probability data for segments are sent to a navigation device (from a server) and the determination step is performed on the navigation device. Thus, as discussed above, the method may be carried out, at least in part, using a navigation device. The navigation device may be a PND or an integrated, e.g. in-vehicle, device. The navigation device may comprise a display for displaying an electronic map to a user, a set of one or more processors configured to access digital map data and cause an electronic map to be displayed to a user via the display, and a user interface operable by a user to enable the user to interact with the device.

In preferred embodiments the method further comprises providing information indicative of a generated parking search route to a user. This may involve outputting the route or information indicative thereof to a user. The information may be in any way indicative of the route, e.g. a set of instructions, which may be audible, visual and/or haptic, but preferably is a visual representation of the route.

In preferred embodiments, the method comprises displaying the parking search route to a user. In preferred embodiments, the step of displaying the route may comprise superposing the route on the electronic map. However other forms of output may be used. For example the method may alternatively or additionally comprise printing information indicative of the at least one route. Thus, the information indicative of the route is preferably output to a user via a navigation device, but in other embodiments the information may be output by any suitable processing device, e.g. by being displayed by a computer apparatus having route generating capability but not necessarily navigation capability, etc. This may be relevant where the route is generated by a server.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

It should be noted that references to a parking related parameter, or value of a parking related parameter, or to a parking probability or parking probability value, or expected parking search time or expected parking search time value, herein should be understood to refer to data indicative of these factors unless the context demands otherwise. The data may be in any way indicative of the relevant parameter, and may be directly or indirectly indicative thereof. Thus any reference to a parking related parameter, e.g. parking probability, may be replaced by a reference to data indicative thereof, i.e. parking probability data. It should also be noted that the phrase "associated therewith" in relation to one or more segments should not be interpreted to require any particular restriction on data storage locations. The phrase only requires that the features are identifiably related to a segment and shorter time period. Therefore association may for example be achieved by means of a reference to a side file, potentially located in a remote server.

The present invention in accordance with any of its further aspects or embodiments may include any of the features described in reference to other aspects or embodiments of the invention to the extent it is not mutually inconsistent therewith.

BRIEF DESCRIPTION OF THE DRAWINGS

Embodiments of the invention will now be described, by way of example only, with reference to the accompanying drawings, in which.

DETAILED DESCRIPTION

Embodiments of the present invention will now be described with particular reference to a processing device, such as a server, that is arranged to access a data store of positional data received from a plurality of mobile devices, such as portable navigation devices (PNDs) that are configured to execute navigation software so as to provide route planning and navigation functionality, and which may be associated within vehicles. The positional data for a mobile device preferably comprises one or more traces; with each trace representing the movement of that device within a certain time period, e.g. within a 24 hour period. Each 24 hour period is typically arranged coincide with a calendar day, but this need not be the case. The server also has access to an electronic map, also referred to as map data, comprising a plurality of segments representative of road network on which the mobile devices can move.

Embodiments of the present invention generally relate to methods of determining parking related data such as parking success probabilities or average parking times for individual segments of an electronic map. The parking related data is determined by analysing the trace data, or more particularly trip data, i.e. by analysing historic positional or probe data from drivers traversing the segments. Particularly, the trace or trip data may be analysed to detect individual successful parking events. In addition to actual parking events, the trace or trip data may be further analysed to detect driving behaviour that is indicative of the user searching for a parking space (hereinafter, a 'parking search'). By detecting a parking search, or particularly the start of a parking search, information may be obtained not only about successful parking events, but also about unsuccessful parking events or parking attempts on the segments traversed during the parking search. This information may then be used to determine parking probabilities for the segments, e.g. by aggregating the data from a plurality of traces. Since the probe data is time-stamped, this information may further be used to determine parking probability profiles for the segments (i.e. showing the temporal variation in parking probability). Similarly, the trace data associated with parking searches may be analysed to determine average parking search times associated with the individual segments. The parking related data may be used in the generation of parking search routes, i.e. to provide parking search guidance, or may be used to provide the user with an indication of the probability of finding a parking space and/or the expected time for doing so from their current position.

Figure 1:
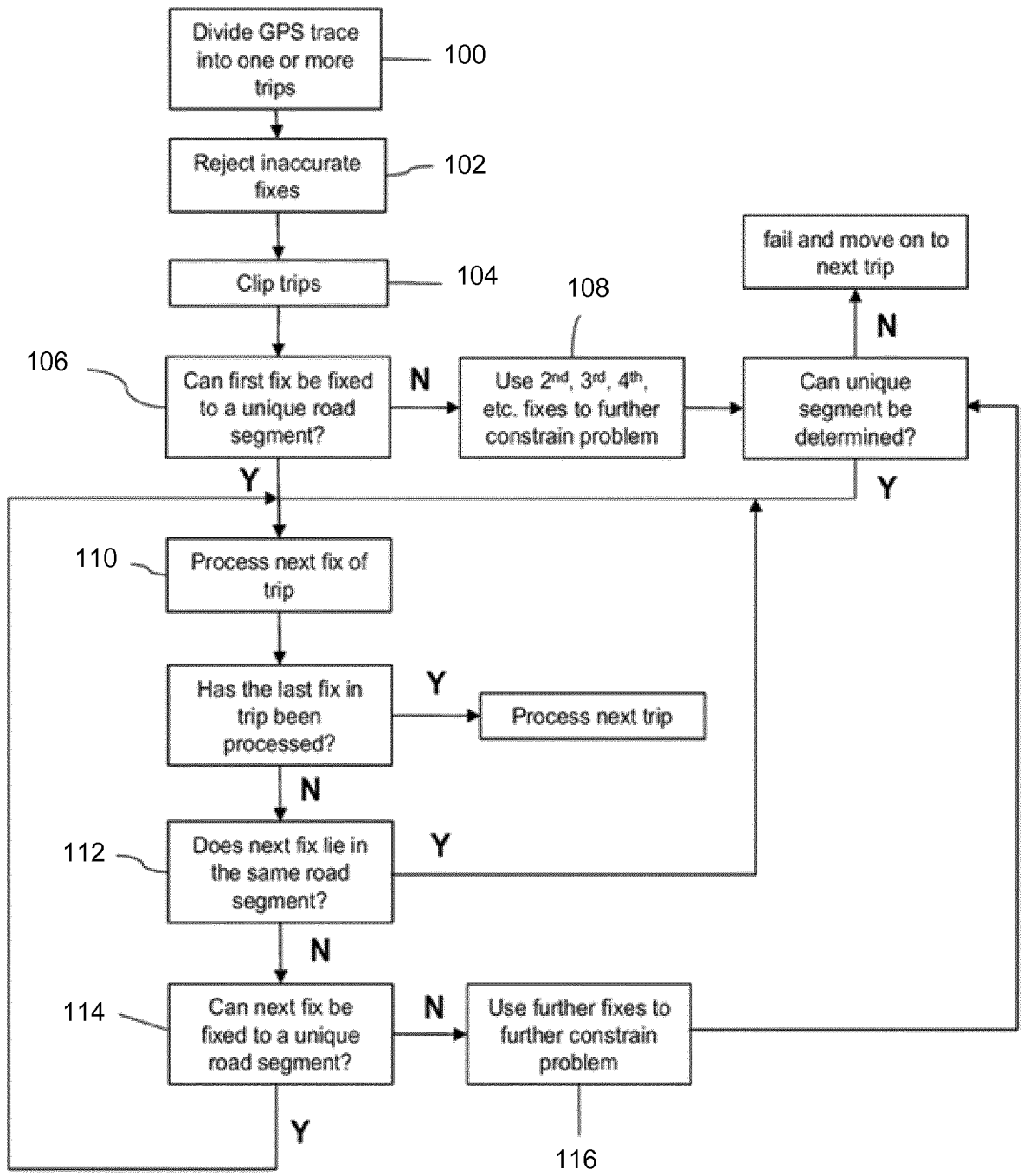
FIG. 1 shows a flowchart outlining an embodiment for matching GPS fixes within a trace to segments of a map.

As a first process, the server may be arranged to perform a map matching function between the map data and the GPS fixes contained within the positional data that has been received and such a process is described in relation to FIG. 1. Such map matching may be performed in a so-called real time manner; i.e. as the positional data is received or may be performed a time later after the positional data has been recalled from the data store. However, it will be appreciated that the techniques described herein may also be implemented, at least in part, using raw probe data, i.e. GPS fixes that have not been map-matched.

In order to increase the accuracy of the map matching, pre-processing of the positional data is performed as follows. Each GPS trace (i.e. a 24 hour period of GPS data) is divided 100 into one or more trips with each trip representing a single journey of the mobile device which are subsequently stored for later processing.

Within each trip GPS fixes whose accuracy report received from the mobile device is not sufficiently high are rejected 102. Thus, in some embodiments, a fix may be rejected if the accuracy report indicates that the signals from less than three satellites were being received by the mobile device in relation to that GPS fix. Further, each trip is clipped 104 when the reported time between fixes goes above a threshold value. Each trip that passes this pre-processing stage is passed to be map matched.

In this context, a clipped trip is a trip in which the there is a time period between consecutive GPS fixes of greater than a predetermined time. As such, it might be inferred that the vehicle has remained stationary and as such it should be considered a first trip has ended and a second trip has commenced. Thus, a clipped trip becomes two separate trips.

However, before a trip is divided a check is made as to whether the position of the vehicle has changed between the last two fixes since a gap above the predetermined time between GPS fixes may also result from a loss of GPS signal and in such circumstances, the trip is not divided. In the embodiment being described, the predetermined time is roughly 3 minutes. However, the skilled person will appreciate that the gap may be any other suitable time, such as roughly any of the following: 15 seconds, 30 seconds, 1 minute, 90 seconds, 2 minutes, 5 minutes, 10 minutes or any time in between these. As discussed hereinafter, if the average speed of a navigation device 200 from which the GPS fixes are sent is below a predetermined threshold then data, may in some embodiments, be rejected in later processing. Such an embodiment can be useful in that it can remove data relating to so-called stop-start traffic which occurs after incidents such as a crash or the like which may leave remaining data more representative of steady state traffic flow.

Then, each trip is taken in turn and fixes within that trip are matched to a map from within the map data. Each map comprises a plurality of road segments along which it is possible to travel with each segment being represented within the map as a straight vector.

The program code running on a processor of the server provides a map matcher that is arranged to step over the or each fix in the trip that is being processed until it finds a fix which lies within a segment or is sufficiently close to a segment in order for it to be assumed to have occurred on that segment (i.e. it is within a distance threshold of the segment). This threshold allows for less than 100% GPS accuracy and the compressing effect of splitting the road into a set of straight vectors. Each trip has an initial fix (i.e. the first fix within the trip) which is harder to associate with a segment than other fixes within the trip since there are no segments that have already identified which can be used to constrain the selection of the segments. If, for this first fix, multiple segments are within the threshold 106, then the algorithm looks to the next GPS fix (i.e. the 2nd fix) within the trip and generates a set of roots from those multiple segments based on the possible travel as a function of the distance between the 2 fixes (i.e. between the 1st and 2nd fixes). If the 2nd fix does not lead to a unique candidate segment for the 1st fix, then the algorithm moves to the 3rd fix within the trip and again generates and compares the possible routes to try and provide a unique candidate for the first fix 108. This process may continue until the remaining GPS fixes within a trip have been processed.

An advantage of such an embodiment is that although any one first fix in isolation may be near multiple segments, and in isolation these segments can't be distinguished between, it becomes possible using the further travel (i.e. the 2nd and 3rd fixes) to determine the identity of the segment with which the first fix is associated. Thus, a fist segment for a trip is determined by the map matcher.

Once the first segment has been identified for a trip, further fixes are processed in order to identify further segments. It is of course possible that the next fix of the trip lies within the same segment as the first fix 112.

Thus, the subsequent fixes of a trip are processed 110 to determine if they are within the distance threshold of the segment, and the map matcher is arranged to associate that segment with each of the fixes that lie within the distance threshold. When the map matcher process a fix that is out with the distance threshold it is arranged to generate a new set of candidate segments for that fix. However, it is now possible to add a further constraint that the next segment is one which is connected to the end of the one which has just been processed. These neighbouring segments are obtained by the map matcher from the underlying map data. If at any point the map matcher fails to identify a segment for a given fix that follows on from the previous segment, either because there are no segments within a threshold, or it cannot uniquely identify a single segment, then the map matcher is arranged to step through subsequent fixes 116 in order to further constrain the journey until it can identify a segment that is a unique match. That is, if the nth fix cannot be uniquely associated with a segment the nth+1 segment is used to further constrain the identification of a segment. If the nth+1 fix does not produce a unique segment then the nth+2 fix is used. In some embodiments, this process may carry on until a unique segment is identified or all of the GPS fixes with a trip have been processed.

The map matcher is arranged to try and uniquely identify segments; in the embodiment being described, it does not attempt to create a continuous route, only to try and match segments to fixes. In other embodiments, it may be desirable to try and have the map matcher generate continuous routes.

Figure 2:
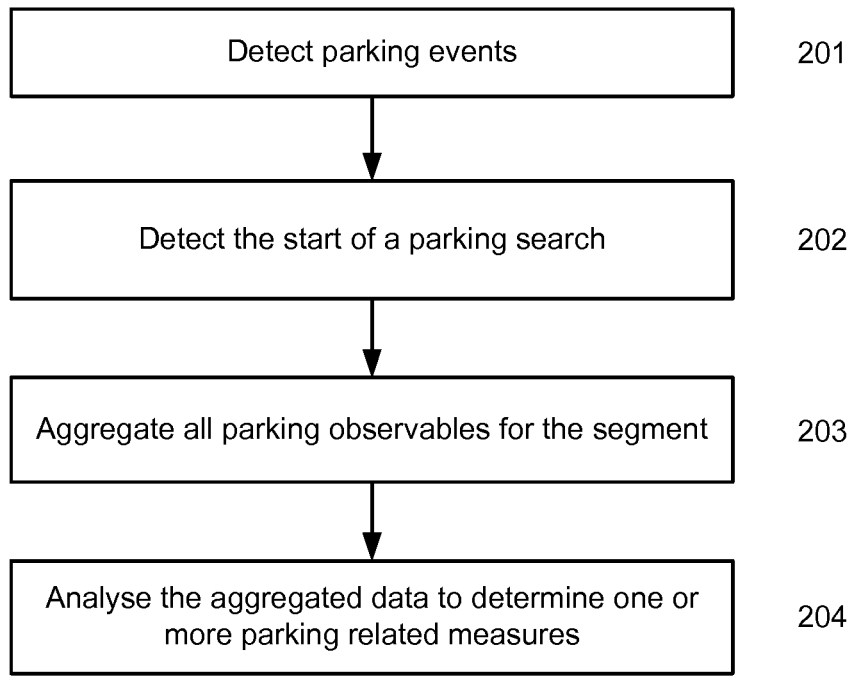
FIG. 2 shows a flowchart outlining an embodiment for determining a parking success probability for an individual road segment.

FIG. 2 schematically shows an algorithm that may be used to determine, or estimate, parking related data such as a parking success probability or average parking time for an individual road segment according to embodiments of the present invention. The algorithm analyses historic traces, each representing the probe data for a single floating-car over a certain time period. The traces may first be split into a plurality of trips, as explained above, with each trip representing a journey from an initial parked (i.e. stationary) position to a destination parked position. That is, the traces are split into trips that at least potentially end with a parking event. The resulting trips, after the splitting process, should have a minimum length, and shorter trips may be discarded. Such shorter trips may relate to a driver stopping for reasons other than parking, e.g. may be generated by a delivery vehicle making regular stops, but not parking. The resulting trips may also be trimmed e.g. to remove fixes that are merely GPS noise or have an insufficient GPS accuracy, especially at the end of the trip. Indeed, various filters or transformers may be applied to the trace or trip data. These filters may be applied to the trace data before the trip-splitting ('trace filters'). Additionally, or alternatively, filters may be applied to the trip data after splitting, either before or after the map-matching ('trip filters'). For example, filters may be applied to remove trips that do not plausibly end in a parking event, such as where the trip ends on a motorway or at a junction. Such data points may for example be generated if the driver turns off the navigation device during the trip. Similarly, filters may be applied to remove trips that end off-road, as these are not relevant for on-street parking. Trip filters may also be applied after parking detection. In general either the trace or trip data may be stored, and the trip splitting and filtering may be performed either at the data storage stage, or during post-processing. The algorithm shown in FIG. 2 may thus be performed using the trace data, and include an initial step of splitting the trace data into trips, or may be performed directly on the trip data.

In a first step 201, the algorithm may detect actual successful parking events. Since a parking event generally reflects the end of a trip, this step may be part of the trip-splitting process. For instance, the first step 201 may simply involve determining the end of a trip that plausibly ends in a parking event.

The algorithm then proceeds in a second step 202 to analyse the probe data within each trip to detect driving behaviour indicative of the start of a parking search. Generally, the parking search detection algorithm analyses the GPS fixes (or more precisely on pairs of consecutive fixes, necessary to derive speeds) for behaviour indicative of a parking search. The parking search algorithm may act on the raw GPS fixes, or on map-matched GPS fixes, or in part on both. To determine the start of a parking search within a trip, the algorithm may iterate over all of the GPS fixes for that trip in reverse chronological order, i.e. working backwards from the end of a trip/actual parking event. Each fix (or pair of fixes) may then be processed to extract relevant parameters that may be used to determine whether or not that fix was part of a parking search.

For example, for each fix, it may be determined whether the average ground speed between that fix and its successor is less than the average or expected free-flow speed on the map-matched segment associated with that fix. Thus, a fix may be marked as 'SLOW' if the speed is below the usual or expected free-flow speed. The speed associated with each fix may be compared with a configurable threshold value, such that a fix may be marked as 'SLOW' if the speed is below the threshold value. The algorithm may also detect consecutive slow segments, even where they are interrupted by small gaps of non-slow segments, as this behaviour may also be indicative of parking search behaviour (e.g. where the non-slow segments represent the driver traversing a segment where it is not possible to park).

As other examples, the fixes may be analysed to determine whether they are close to or part of a turn, such as a U-turn, or a loop.

Turn detection may be performed within the parking search detection algorithm for identifying significant changes of direction within a trip. These turns may then be divided into orthogonal (i.e. ordinary right/left turns) or U-turns. The turn detection may primarily be performed using map-matched data, and basically analyses changes in bearing. For each bearing change above a threshold angle the algorithm creates a TURN object. After all significant turns are detected, the algorithm attempts to join consecutive contiguous turns. A U-turn may be identified where a '180 degree' turn is detected, either directly, or from a series of consecutive turns.

Figure 3:
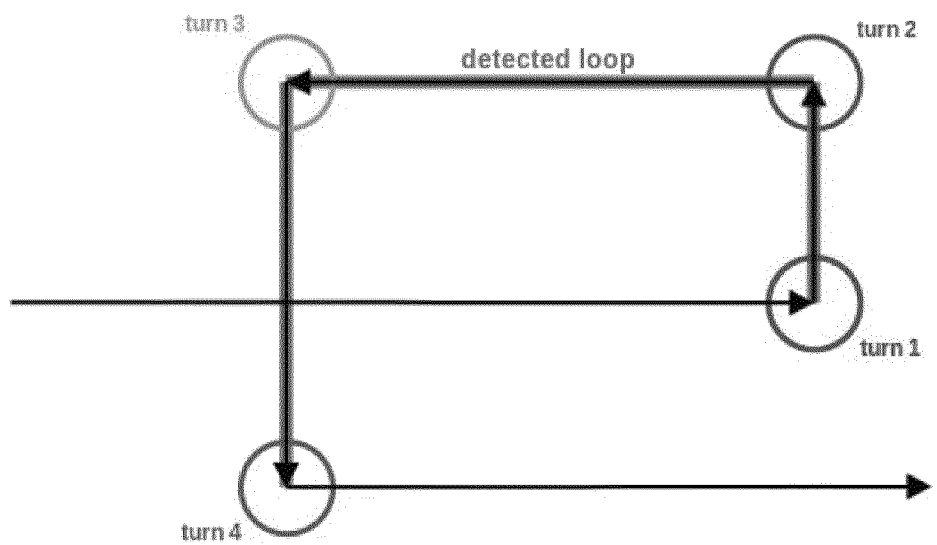
FIG. 3 shows schematically how a loop may be detected within a trip for use in detecting the start of a parking search.

Loop detection may also be performed to identify loops within the trajectory of a trip. A loop is defined as a consistent change in bearing over a spatially bounded sub-sequence of the trip whose accumulated angle indicates a '360 degree' manoeuvre, for instance as shown schematically in FIG. 3. In embodiments, the loop may be determined as a sub-sequence of trip data that starts and ends with the same segment. At the fix level, the loop thus starts with the first fix matched to the first occurrence of a multiply-traversed segment and ends with the last fix matched to the second occurrence of that segment. These two fixes and each fix in between may thus ben marked as being part of a loop. Thus, each fix may be analysed to determine whether it is chronologically between the first and last turn of a loop.

As further examples, it may be determined for each fix whether the fix is close to the end of the trip, or close to the trip destination (where known). For instance, where the driver is within a certain distance from the end of the trip, they are likely to start searching for parking spaces.

It will be appreciated that a lower than expected speed, or a large number of turns or loops may indicate that a driver is no longer driving freely but has instead started to search for a parking space. Some or all of these parameters may be extracted for each fix. For ease of data processing, these parameters may be implemented as binary features, e.g. by setting appropriate threshold values for comparison.

The parking search algorithm need not analyse all of the fixes. For instance, the data may be filtered such that fixes that are unlikely to be part of a parking search (e.g. fixes that are close to the start of the trip) are not analysed. Thus, the parking search algorithm may include information relating to the original destination of the driver, or nearby points of interest, or even personalised knowledge such as a configured home or workplace location, as it is more likely that a driver in the vicinity of their destination or other point of interest will start to begin a parking search. Map attributes such as known parking restrictions, one-way streets, etc. may also be used to help discard data points that could not plausibly be parking events i.e. data points that contradict the map data.

The result of steps 201,202 is that a parking search portion of each trace, or more particularly each trip, is determined. The parking search portion of the trip includes all of the segments that were traversed during the parking search. Thus, for each segment traversed during a parking search it may be determined whether the parking search successfully ended on that segment, i.e. whether the driver was successfully able to park, or whether the parking attempt failed, i.e. the driver was not able to park and instead moved onto an adjacent segment. The parking successes and parking attempts may generally be referred to as 'parking observables'. All of the parking observables from a plurality of traces or trips may then be aggregated in order to generate a data set (step 203). Statistical analysis of this data allows for a probability of parking on that segment and/or the average search time from that segment to be determined (step 204). For instance, the probability of parking on a segment may generally be determined as the ratio of the number of times that a parking search successfully ended on that segment to the number of times that segment was traversed during a parking search. The average search time for a segment is determined by averaging the times that drivers have spent searching for a parking space in the past after having traversed the segment.

Thus, by determining when a user is on a parking search, and then determining on which segments traversed during the parking search a driver did or did not manage to successfully park, and aggregating this information for a plurality of traces/trips, it is possible to statistically estimate various parking related measures for each individual segment in the road network. User feedback may be used to refine or in part in the estimation of the parameters.

GPS fixes are time-stamped. Thus, by restricting the above analysis to certain time slots, e.g. specific days of the week and/or times of the day, parking related data at particular time, or within a particular time slot, may be determined for each segment. In this way, a parking success probability profile may be constructed, the profile showing the temporal variation of the parking related parameter over the course of a time interval comprising multiple time slots, e.g. over the course of a day or a week. The number of time slots may be selected appropriately to determine the resolution or granularity of the profile. For instance, using a greater number of time slots may increase the resolution. However, using a greater number of time slots may also increase the noise, as there will be fewer observations within each time slot. Thus, the number of time slots may be selected based on the amount of data. Typically, it may be desired to determine a parking success probability for each hour of the day, although this may not always be practical. To increase the amount of data, data from different days may be aggregated together. It may be expected that weekdays and weekends show different behaviour, so, in embodiments, weekday data and weekend data may be aggregated separately to generate separate weekday and weekend profiles.

Figure 4:
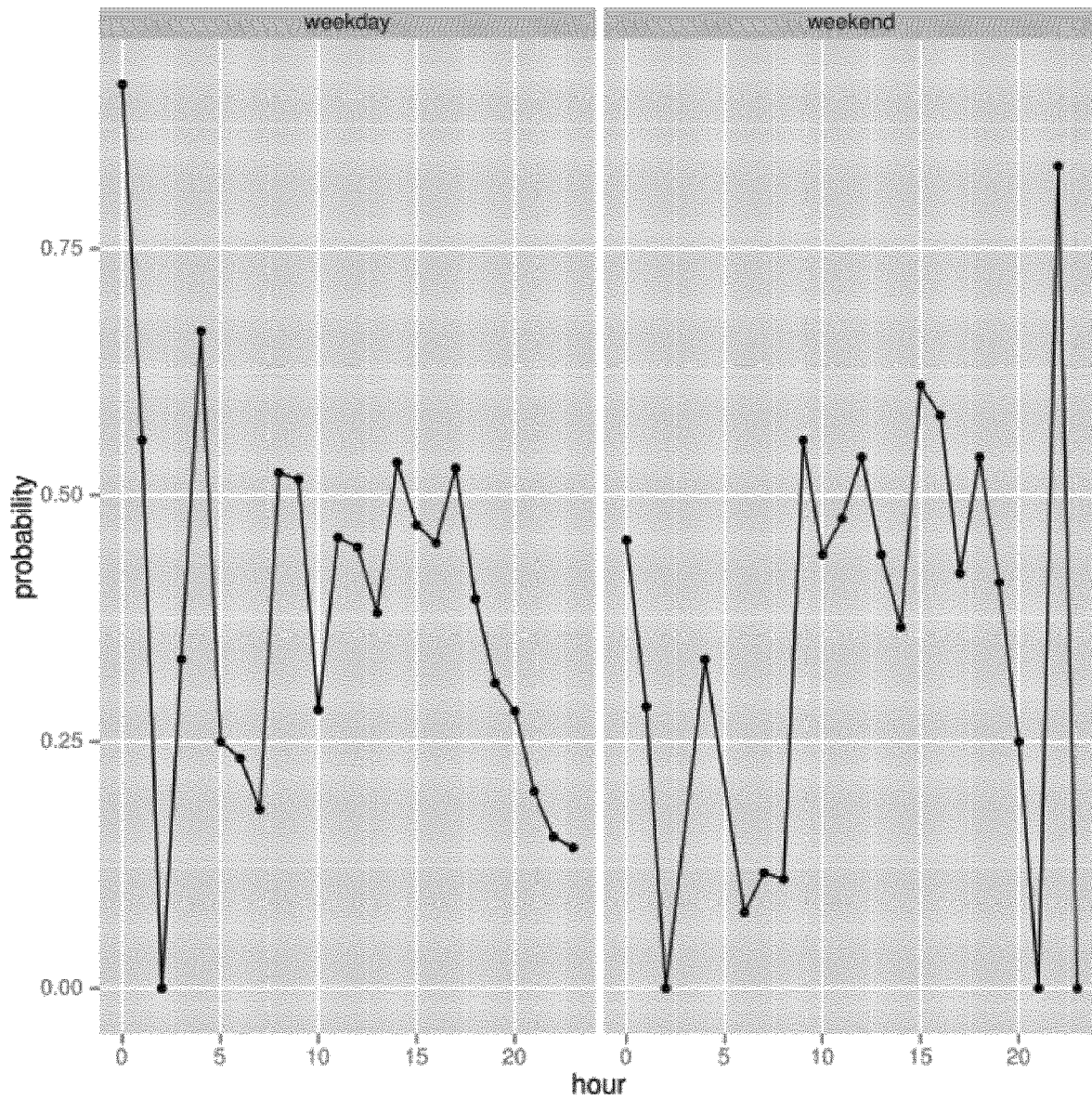
FIG. 4 shows an example of a parking success probability profile for a segment.

FIG. 4 shows an example of a parking success probability profile for a particular segment that may be obtained using the methods outlined above. The profile shown in FIG. 4 represents the hourly parking probability for a weekday (left panel) and a weekend (right panel).

It will be appreciated that the nature of parking events is that there may be very few data points for certain segments or time intervals, as most of the trace data does not relate to a parking search portion of the journey and is redundant. Thus, although the method outlined above in relation to FIG. 2 allows more information to be obtained, i.e. data relating to the parking search as a whole, rather than just parking events, at least for some segments there will still be insufficient data to calculate probabilities with enough confidence. The resulting probability profiles may therefore have a high uncertainty and be significantly affected by noise, as illustrated by the erratic movements of the probability profiles shown in FIG. 4. Especially during the night hours, where there are likely to be fewer data points, the estimated probabilities show significant variation even though there is no real-world reason for them to do so. Nevertheless, the probability profiles shown in FIG. 4 do suggest that there may be an underlying dynamic as the parking probability is generally higher at noon than in the morning/evening.

Figure 5:
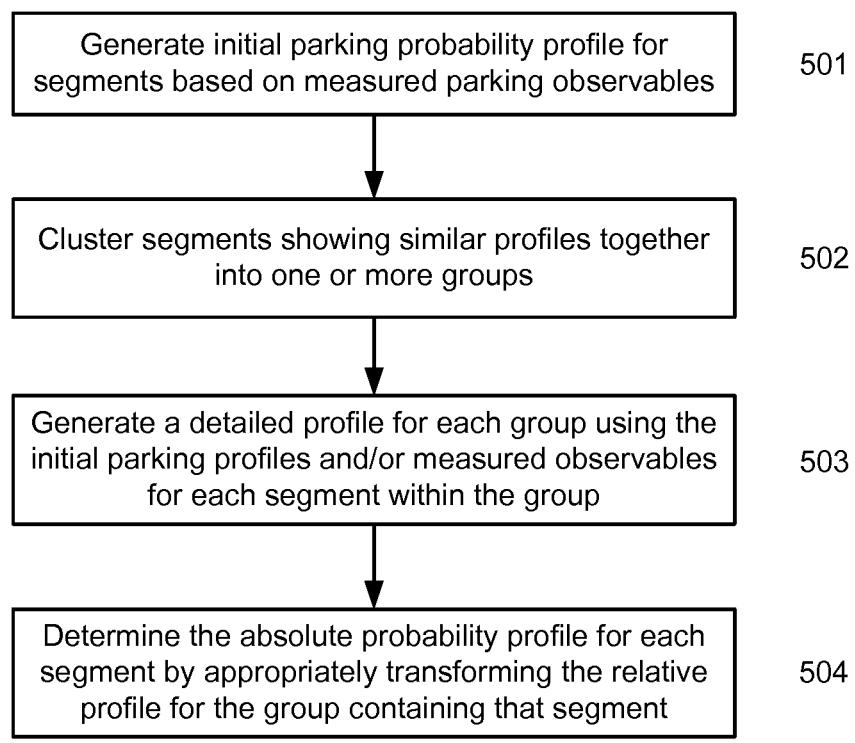
FIG. 5 shows a flowchart outlining another embodiment for determining a parking success probability for an individual road segment.

To help with cases where there a limited amount of data is available, the Applicant has developed a further algorithm, shown schematically in FIG. 5, that instils the real-world dynamics into the parking probability profiles and helps remove noise or smooth the profiles. It will be appreciated that the algorithm illustrated in FIG. 5 may thus be used additionally, or alternatively, to the techniques described above. For example, the algorithm shown in FIG. 5 may be used to smooth profiles obtained using the methods described above, especially where there are relatively few observations. However, in cases where there is enough data such that the parking probability profiles obtained using the method described in relation to FIG. 2 is already sufficiently smooth, the techniques described in FIG. 5 may be unnecessary. Whilst the embodiment shown in FIG. 5 will now be explained with reference to a parking probability profile, it will be appreciated that the algorithm may equally be used for other parking related measures, particularly other time-dependent parking related measures including the average parking search time.

The algorithm illustrated in FIG. 5 is based on the assumption that there is a limited set of parking probability dynamics, and that different road segments sharing similar attributes (e.g. map attributes) are likely to share similar relative parking probability dynamics, even though they may still differ with respect to their global or average parking probability. These assumptions are motivated by the observation that some roads are always better for parking than others, and that parking probability is a function of demand and offer, such that relative parking dynamics should reflect the type of buildings on the road segment, population density, business hours, etc., all of which attributes may be common to many different segments. For example, the parking probability for segments containing a school is likely to be relatively low in the morning and early afternoon, but potentially higher during night hours.

The algorithm thus uses data from similar segments to refine or generate the parking profile for a particular segment where that may otherwise not be possible (or possible with sufficient confidence) due to a lack of data.

Figure 6:
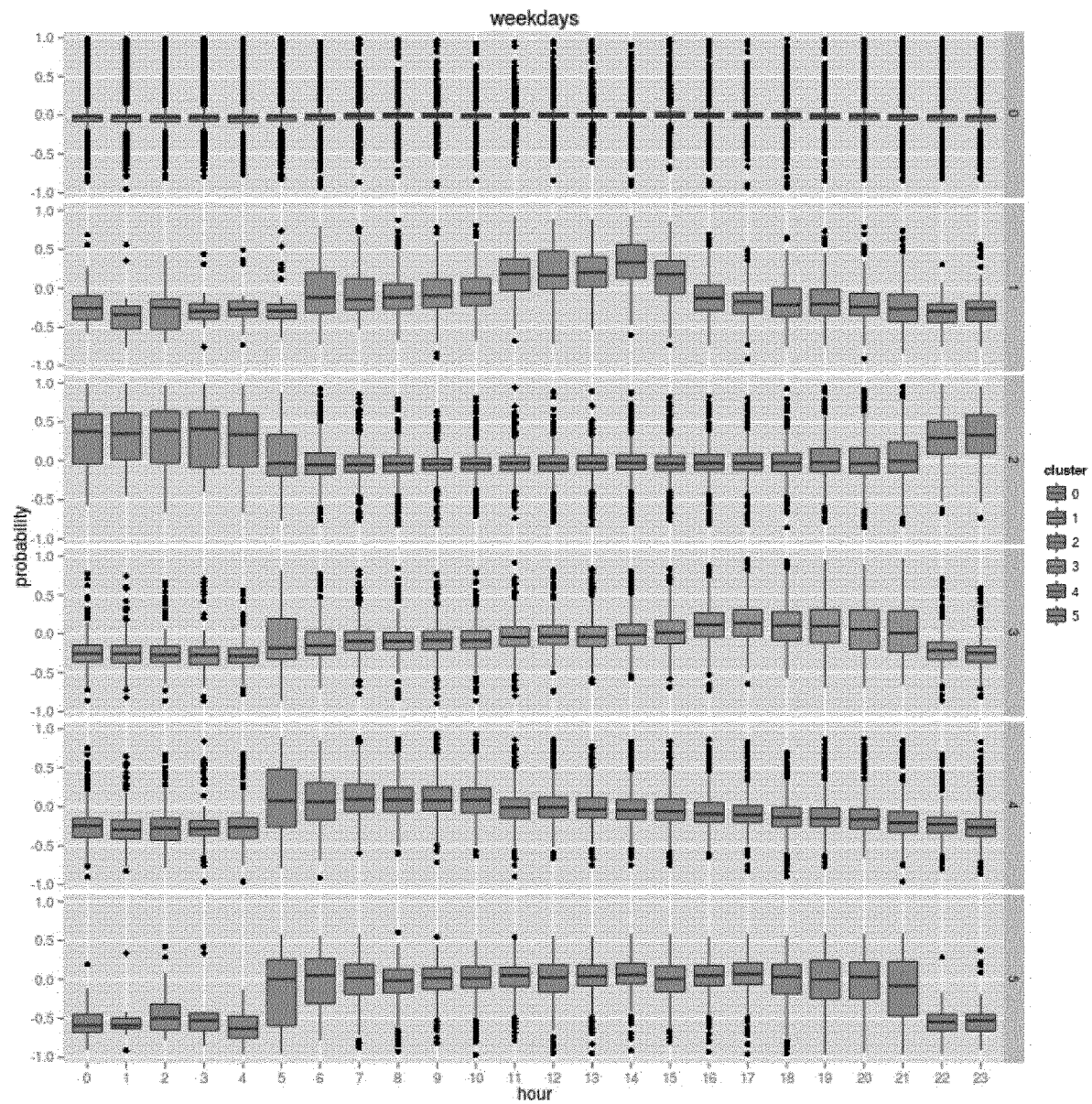
FIG. 6 shows possible relative parking success probability profiles that may be used to model the parking success probability profile for a segment.
Figure 7:
FIG. 7 shows how different segments within a map region may be associated with different relative parking success probability profiles based on the attributes of the segment.

In a first step 501, an initial parking probability profile may be generated for each segment, e.g. using the techniques illustrated in FIG. 2. Based on the initial profiles, segments showing similar profiles or behaviour may then be grouped together (step 502). Alternatively, or additionally, segments may be grouped based on their sharing common road attributes, which may be useful where the data for a particular segment is so incomplete that it is not possible to generate a meaningful parking probability profile. By way of illustration, FIG. 6 shows a set of six relative parking probability profiles associated with six different groups. The profiles are characteristic of the groups. That is, the groups are defined by segments whose profiles share a common temporal variation. FIG. 7 illustrates how as a result of the grouping different segments in a map are grouped into one of the groups shown in FIG. 6. The roads within each group are associated with the relative parking probability profile of that group.

The grouping may be performed by a clustering or other class building method. For instance, the grouping may be performed by a hierarchical or fuzzy clustering technique. Preferably, the grouping is performed by means of the so-called k-means clustering technique, where k is the desired number of clusters. This non-hierarchical method normally starts with k random seeds and redistributes the class members according to a minimum error criteria based on a chosen metric. The algorithm leads to local minima only, therefore for an optimal solution it has to run multiple times. The run with the minimum error estimates gives what may be a preferred solution. The centroids of the final clusters form the predefined clusters. The value of k may be chosen appropriately to keep the amount of clusters reasonably small while still allowing a rich set variety between the clusters.

Figure 8:
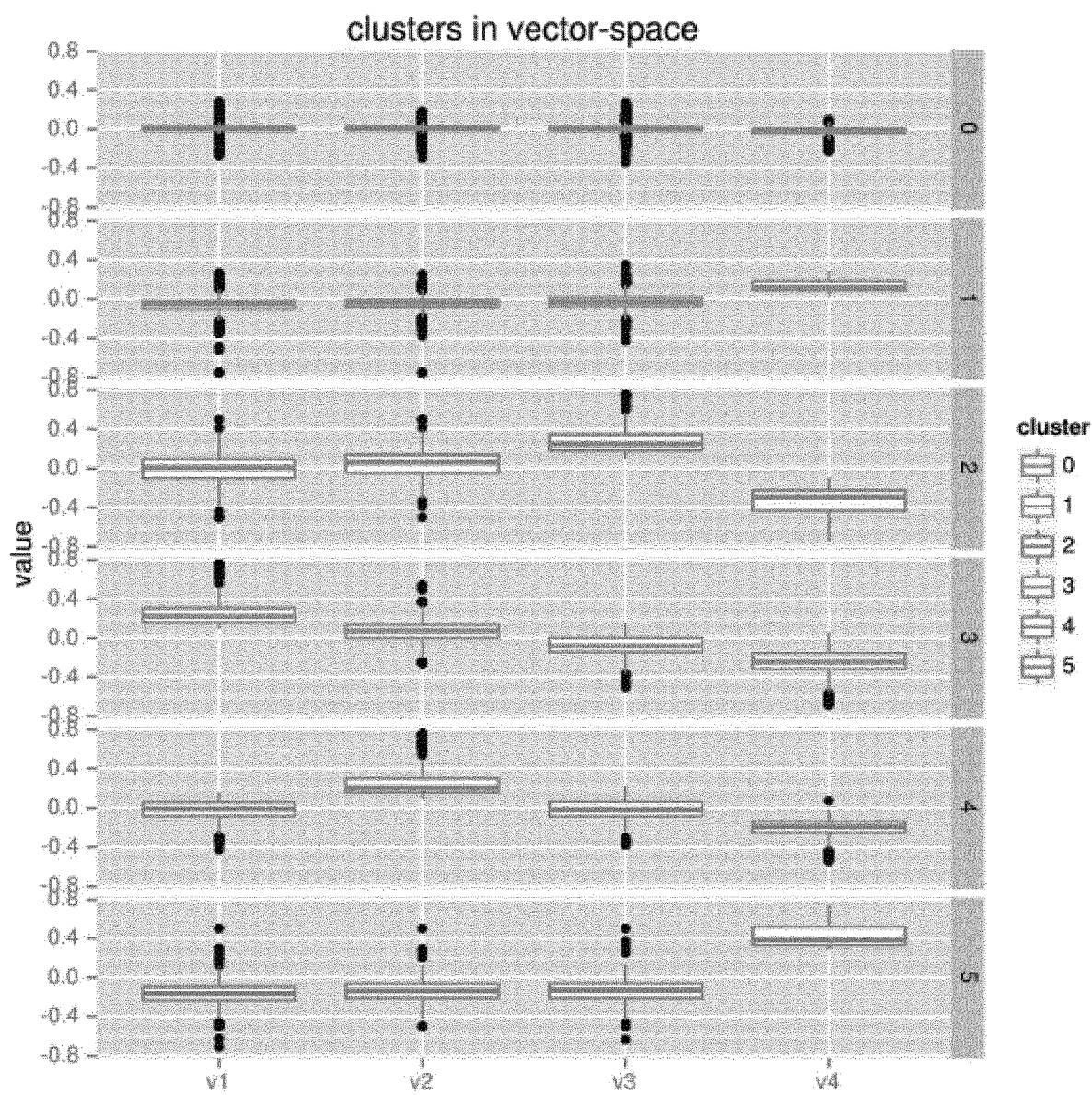
FIG. 8 shows how different road segments may be clustered according to one embodiment.

The k-means clustering process is illustrated in FIG. 8. In the process shown in FIG. 8 four time-bins are defined (generally, morning, noon, evening and night), and these bins are used to identify common relative behaviour between segments. The time-bins may be partially overlapping to help account for trips that extend across different time-bins. Although FIG. 8 shows four time-bins, it will be appreciated that the number of time-bins can of course be adjusted as needed based on the desired resolution and amount of data available. In general, where N time-bins are used, the result is that an N-dimensional vector is determined for each segment, with each dimension representing one of the time-bins, and each element of the vector therefore representing a parking probability for the respective time bin. Thus, for the embodiment illustrated in FIG. 8, a four-dimensional vector is generated for each segment. All of the parking observables (parking successes, parking attempts) for each segment are thus accumulated into the four time-bins, and a probability estimation calculated in each of the bins for each segment. The four-dimensional vectors for each segment may be normalised by subtracting the mean value of the vector from each of the elements such that the vector mean is zero. The (normalised) four-dimensional vectors for each segment within the map are then analysed so as to cluster together segments showing similar behaviour over the four time-bins.

The result of this clustering, as illustrated in FIG. 8, is that segments exhibiting similar parking profiles are clustered together into one of the clusters (labelled 0 to 5 in FIG. 8). FIG. 8 thus shows that each of the segments can be associated with one of six different types of relative parking behaviour. It will be appreciated from the box plots shown in FIG. 8 that there may be significant variation from each of the groups, and the grouping is relatively rough. It will be understood that the box plots are shown only for visualisation purposes. In practice, all that is calculated may be a median for each time period. Naturally, further clusters may be added to try and form tighter groups. A null cluster may also be formed, e.g. having a flat line profile, for clustering segments that have no trustworthy trend and cannot be reliably grouped with other segments.

The clustering thus acts to locate segments exhibiting similar parking data. By normalising the data as part of the clustering process, even segments relating to different road classes, etc. may be clustered where they are similar.

Even if the time resolution used in the cluster analysis procedure itself is coarser than is finally desired, which may occur in order that there are a sufficient number of reliable average speed in any one predetermined time period, the time resolution can subsequently be modified. For example, it can be modified to finer resolution to meet the requirements of the intended use. For example, it can be advantageous to have a finer resolution having a more continuous profile in place is desired to provide smoother routes which might otherwise "jump" on time boundaries if the time resolution is too coarse. In the embodiment being described, the cluster-generated profiles may be interpolated in order that they have a resolution of roughly hourly intervals, like the profile shown in FIG. 4, although any other period may be used. Such a period may be convenient for later processing using the cluster-generated speed profile.

Once the groups or clusters are formed, the data obtained for each of the segments in the group may then be aggregated together and analysed to generate a detailed relative parking probability profile for the group (step 503). That is, the data for all segments within the cluster (i.e. those displaying the same relative parking behaviour) may be aggregated to determine a relative parking profile for the cluster. As mentioned above, if the number of segments within each group is large enough, there may be enough data points to generate finer parking probability profiles. That is, the detailed profile may be generated showing the relative parking probability at hourly intervals (or any other suitable time interval, depending on the amount of data).

The result of step 503 is that each segment is associated with one of a relatively small set of relative probability profiles. However, ultimately, the aim is to determine the absolute probability profile for each segment (step 504). The parking probability for each segment may be generated by translating the relative profile associated with that segment appropriately. The amount of translation may be determined based on the parking probability actually measured for that segment (e.g. using the techniques described above in relation to FIG. 2). Alternatively, or additionally, the translation factor may be determined based on a known or expected parking probability for that segment. Where necessary, the translated parking profile may need to be capped, e.g. between [0,1]. The parking profile for a particular segment may therefore be associated with that segment as an identifier to the respective relative profile and the absolute probability for the segment (or a suitable transformation factor allowing the absolute probability to be obtained from the relative profile). It is also contemplated that the absolute profiles may be stored with each segment, or more particularly seven profiles (one for each day), as this may allow more flexibility, e.g. if it desired to dynamically adjust the profiles using live data.

Once the parking related data for the segments is determined, e.g. in the manner discussed above, parking related information may be displayed to the user in various forms.

For instance, as mentioned above, the parking related data may comprise a parking success probability for a segment. The probability of finding a parking space on a segment may be determined as the ratio of the number of times that a parking search ended on that segment to the number of times that segment was traversed during a parking search. This value may be normalised based on the length of the respective segments. Naturally this is a measure of the probability of finding a parking space on a particular segment, and this probability may be displayed to a driver currently in a parking-space search, or e.g. to a driver approaching a destination. Additionally, or alternatively, this information may be used in routing, e.g. to find a route that maximises the probability of finding a parking space within the vicinity of a destination, optionally subject to a time constraint.

Another useful measure, also mentioned above, is the expected time to find a parking space having traversed a particular road segment. This information is readily obtainable from the data sets obtained using the techniques described above based on the average time that previous users have spent searching for a parking space after having traversed a particular segment, i.e. the remaining time until the actual parking event after crossing this segment during a parking search. Naturally, this measure is indicative of the time required to find a parking space in the vicinity of the segment. Accordingly, this information may be provided to the driver during or after the route-planning stage. For example, this information may be provided to the user when they arrive at the segment, where the user is aiming to park at that segment. This information may be provided by itself, or as part of parking-search guidance functionality. Additionally, or alternatively, this information may be incorporated into the route planning and estimated time of arrival calculations.

A further useful measure is the probability that parking on a segment is possible at all. This measure may be used in parking-search guidance or routing algorithms alongside or instead of the probability of finding a parking space, especially where the latter is not available or where confidence is low. The probability that parking is possible may be based on the ratio between partial and full traversals of the segment in the probe data, appropriately normalised by flow.

For each of these measures, a respective confidence may be provided having two contributions: a statistical confidence based on the amount of data available (e.g. the amount of parking searches traversing a segment); and a methodological confidence representing the confidence with which a parking search was correctly identified.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, the skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data. Such positioning data, could for example be derived from position data derived from mobile phone operation, data received at toll barriers, data obtained from induction loops embedded in roads, data obtained from number plate recognition system or any other suitable data.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method for generating parking related data in respect of one or more navigable elements of a navigable network within a geographic area, each navigable element being represented by a segment of an electronic map, the electronic map comprising a plurality of segments representative of the navigable network, said method comprising:

obtaining positional data relating to a plurality of trips made by vehicles in the navigable network, each trip being a journey between stationary periods indicative of the vehicle being in a parked state;

analysing, for each one of the plurality of trips, the positional data to identify a parking space search portion of the trip, the analyzing including analysing the respective positional data to identify a start of a parking space search during the trip that defines the start of the parking space search portion of the trip;

analysing the positional data corresponding to the parking search portions of the trips to obtain, for each one of at least one set of a plurality of different time periods, a relative value of the parking related parameter associated with each one of a plurality of segments of the electronic map in respect of the time period, the parking related parameter being a time dependent parameter;

clustering, for the or each set of time periods, the segments into groups of segments based on the relative values of the parking related parameter obtained for the segments in each time period of the set, wherein, for each of the time periods of the set of time periods, the segments in each group of segments are considered to have similar relative values of the parking related parameter;

using, for each group, relative parking related parameter data associated with each of the segments of the group to generate an aggregate profile that represents a time dependence of the relative value of the parking related parameter for that group, wherein the aggregate profile is used as a representation of the time dependence of the parking related parameter for all of the segments of that group;

generating a parking search route based on one or more of the aggregate profiles; and displaying, on a display, a representation of the parking search route, the displaying including superposing the representation of the parking search route on an electronic map displayed on the display.

2. The method of claim 1, wherein the parking space search portion is detected based on one or more criteria using the positional data in respect of the trip, the criteria including the positional data being indicative of one or more of; the vehicle performing one or more turns, the vehicle performing one or more loops, and the vehicle travelling at a speed below a predetermined threshold.

3. The method of claim 1, wherein the predetermined threshold is set with respect to a free flow speed for the segment.

4. The method of claim 1, wherein said identified point is considered to be a candidate point for the start of a parking space search, the method comprising considering one or more further criteria to determine whether the candidate point may be confirmed as the start of a parking space search, wherein the criteria include one or more of; the point being within a predetermined distance of the end of the trip, the point being within a predetermined distance of a turn performed by the vehicle and/or being within a loop performed by the vehicle.

5. The method of claim 4, wherein the step of determining whether the candidate point may be confirmed as the start of a parking space search further takes into account a distance travelled at the speed below the predetermined threshold.

6. The method of claim 1, wherein:
the parking parameter is a parking probability; and
the parking probability obtained for a segment is based on a ratio of the number of times the segment is traversed without finding a parking space according to the parking space search portion data to the number of times a parking space is successfully found on the segment according to the parking space search portion data.

7. The method of claim 1, wherein the parking related parameter is an expected parking search time.

8. The method of claim 7, wherein the expected parking space search time is based on the average remaining time spent searching for a parking space after traversing the segment according to the parking space search portion data.

9. The method of claim 1, wherein the parking related parameter is a time dependent parameter, and a plurality of values of the parameter are determined for each segment, each value of the parking related parameter being in respect of a different time period.

10. The method of claim 1, further comprising associating data indicative of the parking probability for the segment with each segment in the electronic map for which such data is determined.

11. The method of claim 1, comprising associating data indicative of the aggregate profile in association with each segment of the group.

12. The method of claim 1, further comprising using the parking related parameter data obtained for determining an estimated time to find a parking space.

13. The method of claim 1, wherein the aggregate profile is generated for a given group by:
computing, for each time period of a specified set of time periods, an average or mean value of the parking related parameter for each of the segments of the given group; and
combining the average or mean values of the parking related parameter into the aggregate profile.

14. The method of claim 1, further comprising:
generating a set of instructions indicative of the parking search route; and
outputting instructions from the set of instructions for guiding a user on the parking search route as the user travels the parking search route.

15. A system constructed and arranged to generate parking related data in respect of one or more navigable elements of a navigable network within a geographic area, each navigable element being represented by a segment of an electronic map, the electronic map comprising a plurality of segments representative of the navigable network, said system comprising:
processing circuitry configured to:
obtain positional data relating to a plurality of trips made by vehicles in the navigable network, each trip being a journey between stationary periods indicative of the vehicle being in a parked state;
analyse, for each one of the plurality of trips, the positional data in respect of the trip to identify a parking space search portion of the trip, the analyzing including analysing the respective positional data to identify a start of a parking space search during the trip that defines the start of the parking space search portion of the trip;
analyze the positional data corresponding to the parking search portions of the trips to obtain, for each one of at least one set of a plurality of different time periods, a relative value of the parking related parameter associated with each one of a plurality of segments of the electronic map in respect of the time period, the parking related parameter being a time dependent parameter;
cluster, for the or each set of time periods, the segments into groups of segments based on the relative values of the parking related parameter obtained for the segments in each time period of the set, wherein, for each of the time periods of the set of time periods, the segments in each group of segments are considered to have similar relative values of the parking related parameter;
use, for each group, relative parking related parameter data associated with each of the segments of the group to generate an aggregate profile that represents a time dependence of the relative value of the parking related parameter for that group, wherein the aggregate profile is used as a representation of the time dependence of the parking related parameter for all of the segments of that group;
generate a parking search route based on one or more of the aggregate profiles; and
display, on a display, a representation of the parking search route, the displaying including superposing the representation of the parking search route on an electronic map displayed on the display.

16. The system of claim 15, wherein the processing circuitry is further configured to:
generating a set of instructions indicative of the parking search route; and
outputting instructions from the set of instructions for guiding a user on the parking search route as the user travels the parking search route.

17. A non-transitory computer readable medium having stored thereon instructions which, when executed by a computing device, cause the computing device to perform a method for generating parking related data in respect of one or more navigable elements of a navigable network within a geographic area, each navigable element being represented by a segment of an electronic map, the electronic map comprising a plurality of segments representative of the navigable network, said method comprising:
obtaining positional data relating to a plurality of trips made by vehicles in the navigable network, each trip being a journey between stationary periods indicative of the vehicle being in a parked state;
analysing, for each one of the plurality of trips, the positional data to identify a parking space search portion of the trip, the analyzing including analysing the respective positional data to identify a start of a parking space search during the trip that defines the start of the parking space search portion of the trip;

analysing the positional data corresponding to the parking search portions of the trips to obtain, for each one of at least one set of a plurality of different time periods, a relative value of the parking related parameter associated with each one of a plurality of segments of the electronic map in respect of the time period, the parking related parameter being a time dependent parameter;

clustering, for the or each set of time periods, the segments into groups of segments based on the relative values of the parking related parameter obtained for the segments in each time period of the set, wherein, for each of the time periods of the set of time periods, the segments in each group of segments are considered to have similar relative values of the parking related parameter;

using, for each group, relative parking related parameter data associated with each of the segments of the group to generate an aggregate profile that represents a time dependence of the relative value of the parking related parameter for that group, wherein the aggregate profile is used as a representation of the time dependence of the parking related parameter for all of the segments of that group;

generating a parking search route based on one or more of the aggregate profiles; and display, on a display, a representation of the parking search route, the displaying including superposing the representation of the parking search route on an electronic map displayed on the display.

18. The non-transitory computer readable medium of claim 17, wherein the method further comprises:

generating a set of instructions indicative of the parking search route; and outputting instructions from the set of instructions for guiding a user on the parking search route as the user travels the parking search route.

* * * * *